United States Patent
Ruchatz et al.

(10) Patent No.: US 11,041,942 B2
(45) Date of Patent: Jun. 22, 2021

(54) LIDAR-SENSOR AND METHOD FOR OPTICAL SCANNING OF AN ENVIRONMENT

(71) Applicant: Volkswagen Aktiengesellschaft, Wolfsburg (DE)

(72) Inventors: Thomas Ruchatz, Leiferde (DE); Thorsten Bagdonat, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 343 days.

(21) Appl. No.: 15/787,728

(22) Filed: Oct. 19, 2017

(65) Prior Publication Data

US 2018/0113202 A1    Apr. 26, 2018

(30) Foreign Application Priority Data

Oct. 21, 2016    (DE) .................... 10 2016 220 708.3

(51) Int. Cl.
*G01C 3/08*    (2006.01)
*G01S 7/481*   (2006.01)
*G01S 17/42*   (2006.01)
*G01S 17/06*   (2006.01)
*G01S 17/931*  (2020.01)

(52) U.S. Cl.
CPC .......... *G01S 7/4817* (2013.01); *G01S 7/4813* (2013.01); *G01S 17/06* (2013.01); *G01S 17/42* (2013.01); *G01S 17/931* (2020.01)

(58) Field of Classification Search
CPC ...... G01S 7/4813; G01S 7/4817; G01S 17/42; G01S 17/06; G01S 17/936
USPC ......................................... 356/5.01
See application file for complete search history.

(56) References Cited

U.S. PATENT DOCUMENTS

| | | | | |
|---|---|---|---|---|
| 5,550,669 A | * | 8/1996 | Patel ............... | G01C 11/02 248/485 |
| 5,552,893 A | * | 9/1996 | Akasu ............. | G01C 3/00 356/4.01 |
| 7,969,558 B2 | * | 6/2011 | Hall ............... | G01S 7/4813 356/5.01 |
| 8,730,583 B2 | * | 5/2014 | Schek ............. | G02B 27/0068 359/656 |

(Continued)

FOREIGN PATENT DOCUMENTS

| | | | | |
|---|---|---|---|---|
| CN | 203101634 U | 7/2013 | ............ | G01S 17/95 |
| CN | 104535984 A | 4/2015 | ............ | G01S 7/481 |

(Continued)

*Primary Examiner* — Mark Hellner
(74) *Attorney, Agent, or Firm* — Slayden Grubert Beard PLLC

(57) ABSTRACT

The invention relates to a lidar sensor (1) comprising at least one transmitting unit (S1-S4) and at least one receiving unit (E1-E4), wherein the transmitting unit (S1-S4) is designed to pivot a light signal in a horizontal direction, wherein the light signal is tilted at an angle α relative to a ground surface (5), wherein the transmitting unit (S1-S4) and the receiving unit (E1-E4) are designed as an assembly (2) and the lidar sensor (1) has an adjusting device (2) that is designed so that the assembly (2) can be tilted by at least one angle β in a vertical direction, and a method for optically scanning an environment by means of a lidar sensor (1).

18 Claims, 1 Drawing Sheet

(56) References Cited

U.S. PATENT DOCUMENTS

| | | | | |
|---|---|---|---|---|
| 8,909,375 B2* | 12/2014 | Larson | ............... | G01S 7/4817 |
| | | | | 700/245 |
| 10,670,726 B2 | 6/2020 | Suzuki et al. | | |
| 2013/0317649 A1 | 11/2013 | Larson et al. | ............... | 700/259 |
| 2016/0291134 A1* | 10/2016 | Droz | ............... | G01S 7/4817 |

FOREIGN PATENT DOCUMENTS

| | | | |
|---|---|---|---|
| CN | 204422748 U | 6/2015 | ............ G01S 17/95 |
| CN | 106030243 A | 10/2016 | ............ G01C 3/06 |
| DE | 4137551 A1 | 3/1993 | |
| DE | 10110420 A1 | 9/2002 | |
| DE | 102004014041 A1 | 10/2005 | |
| DE | 102009015832 A1 | 10/2010 | |
| DE | 102011001387 A1 | 9/2012 | |
| DE | 112012001708 T5 | 1/2014 | |
| DE | 102013011853 A1 | 1/2015 | |
| DE | 102014104027 A1 | 9/2015 | |
| WO | 2008008970 A2 | 1/2008 | |
| WO | 2011146523 A2 | 11/2011 | |
| WO | 2012141868 A1 | 10/2012 | |

* cited by examiner

LIDAR-SENSOR AND METHOD FOR OPTICAL SCANNING OF AN ENVIRONMENT

CROSS REFERENCE TO RELATED APPLICATIONS

This application claims the priority benefit of German Patent Application DE 10 2016 220 708.3, filed on Oct. 21, 2016 with the German Patent and Trademark Office. The contents of the aforesaid German Patent Application are incorporated herein in their entirety for all purposes.

BACKGROUND

The invention relates to a lidar sensor and a method for optically scanning an environment.

Lidar sensors (light detection and ranging) are used to detect objects and their distance. A preferred application of such lidar sensors is motor vehicle technology. Various designs are known.

Accordingly, designs are known, for example, where a plurality of transmission units are provided, wherein their light beam is deflected 360° in a horizontal direction by a rotating mirror, wherein the transmission units are aligned in a vertical direction at various angles to a ground surface. The horizontal region that is scanned by a light beam can also be described a scan plane. Instead of a rotating mirror, MEMS or solid-state lidar systems are known where the horizontal pivoting movement is realized differently. Such a lidar system with up to 64 transmission units is known from WO 2011/146523 A2 or WO 2008/008970 A2. Such systems are, however, still very expensive and complex at present. Commercially available lidar systems therefore frequently have only four scan planes.

An optoelectronic device is known from DE 10 2014 104 027 A1 for detecting object information from a monitoring region with a light receiver, a receiving optical system associated with the light receiver that has an adaptive lens with a variable tilt, and an evaluation unit for generating the object information from a received signal of the light receiver. The evaluation unit is designed to bring the adaptive lens into several different tilt positions and thereby obtain additional object information from an enlarged monitoring region.

An optical scanning system is known from DE 10 2011 001 387 A1, wherein the transmitters are shifted when transmitting the test light beams, and/or the receivers are shifted while receiving the measuring light beams, in order to scan a horizontal region so that rotating mirrors can be dispensed with. The shifting can be carried out for example by pivoting or tilting.

SUMMARY

An underlying object of the invention is to create a lidar sensor by means of which a greater number of scan planes can be easily realized, as well as to provide a method for optically scanning an environment by means of such a lidar sensor.

The object is solved by a lidar sensor having the features of the independent apparatus claim, and a method having the features of the independent method claim. Additional embodiments will become apparent from the dependent claims.

The lidar sensor comprises at least one transmitting unit and one receiving unit, wherein the transmitting unit is designed to pivot a light signal in a horizontal direction, wherein the light signal is tilted at an angle to a ground surface. The transmitting unit and the receiving unit are designed as an assembly. The lidar sensor has an adjusting device that is designed so that the assembly can be tilted by at least one angle in a vertical direction.

BRIEF DESCRIPTION OF THE DRAWINGS

The invention will be explained in the following in more detail with reference to examplary embodiments. In the FIGS..

DETAILED DESCRIPTION OF EMBODIMENTS

Figure 1:
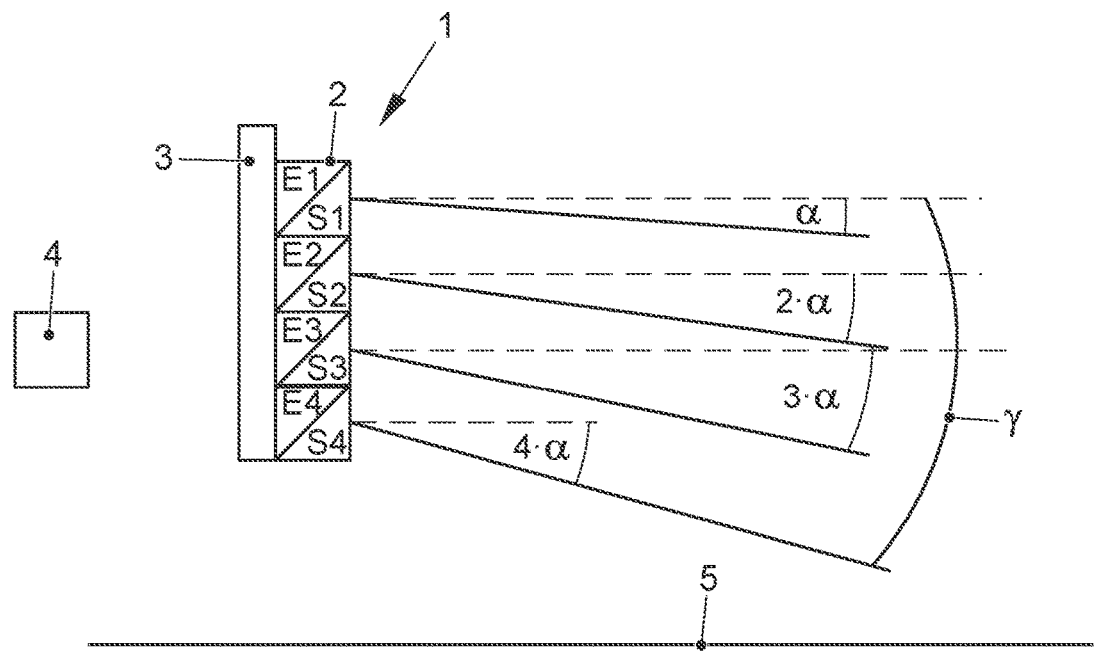
FIG. 1 shows a schematic representation of an embodiment of a lidar sensor in first position.

In one embodiment, the number of scan planes are increased depending on the number of possible tilt positions of the adjusting device. The advantage of such a vertical adjusting device is that its structure is relatively robust and simple. The adjusting device can be designed as a pivoting/rotating module, or as a linear drive in which the linear movement is converted into a small rotary angle by a suitable gear unit. In particular, piezo servomotors are suitable for this since they can be actuated very easily with high precision.

In principle, the lidar sensor may in an embodiment be designed with a single transmitting unit and receiving unit. However, this may restrict the measuring frequency. If for example, the measuring time for a scan plane is $T_0$ and 20 scan planes are to be realized, the measuring time for the entire detection range is multiplied twenty times. In addition, there is the adjusting time for the adjusting device.

In another embodiment, the lidar sensor has at least two transmitting units and receiving units, wherein the light signals of the transmitting unit are tilted at different angles relative to the ground surface. For each posed task, a corresponding compromise may be reached between the number of transmitting units and the number of angle positions (scan planes) and hence the measuring time. In one embodiment, the lidar sensor has at least four transmitting units.

In principle, each assembly consisting of one transmitting unit and one receiving unit may, e.g., have its own adjusting device so that all transmitting units can be controlled independent of each other. However, the effort for the adjusting devices is correspondingly high. Accordingly and in another embodiment, at least two transmitting units and receiving units are therefore designed as an assembly to which a common adjusting device is assigned. In another embodiment, all transmitting units and receiving units are designed as an assembly to which a common adjusting device is assigned.

In another embodiment, the adjusting device is designed to tilt the assembly in a plurality of angles in a vertical direction.

In one embodiment, the light beams of the transmitting units in a vertical direction define an opening angle, wherein the adjusting device is designed to tilt the assembly by at least the opening angle. If the assembly then for example is tilted by the opening angle, or a multiple of the opening angle, the overall opening angle can hence be correspondingly enlarged. If for example, the opening angle of four transmitting units in an initial position is 4° overall and the adjusting device can be tilted into four different positions by 4° in each case from the preceding position, an overall opening angle of 20° can be achieved.

Alternatively and in another embodiment, the light beams of adjacent transmitting units may define a partial opening angle, wherein the adjusting device is designed to tilt the assembly by at least a fraction of the partial opening angle. Accordingly, the resolution can be increased, wherein the overall opening angle can also be slightly enlarged. If for example the partial opening angle between two transmitting units is 1° and the adjusting device has three angle positions, the assembly is tilted by ⅓° in the second position, and ⅔° in the third position, relative to the initial position.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 schematically shows a lidar sensor 1. The lidar sensor 1 comprises four transmitting units S1 to S4 and four receiving units E1 to E4 that are combined into an assembly 2. The assembly 2 is connected to an adjusting device 3 by means of which the assembly 2 can be tilted vertically. Moreover, the lidar sensor 1 has a control unit 4 that controls the transmitting units S1-S4, receiving units E1-E4 and adjusting device 3. The light signal of the first transmitting unit S1 is tilted at an angle α relative to a ground surface 5.

Correspondingly, the light signal of the second transmitting unit S2 is tilted 2·α relative to the ground surface 5, and lastly, the light signal of the fourth transmitting unit 4 is tilted 4·α relative to the ground surface 5. It should be noted that it is not essential for the angle of the light signals to each be multiples of α. It is also possible for them to differ by a fixed angular distance Δα, i.e. α, α+Δα, α+2Δα, and α+3Δα. In this first position, the vertical opening angle γ of the lidar sensor is 4·α.

Figure 2:
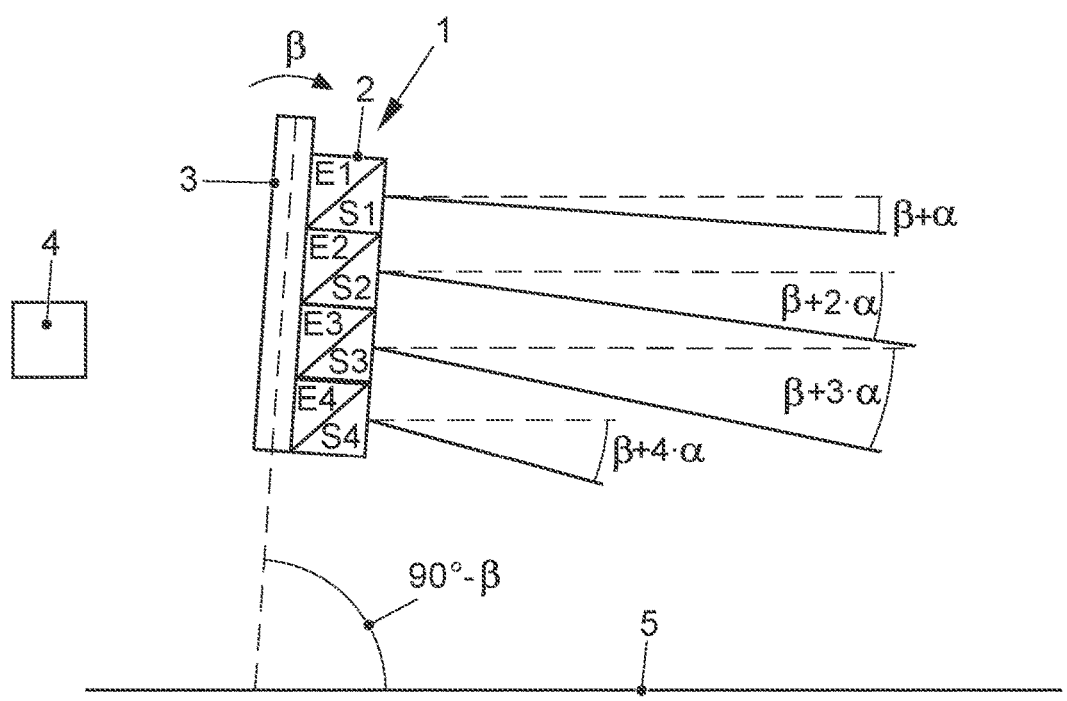
FIG. 2 shows a schematic representation of an embodiment of a lidar sensor in second position.

To increase the overall opening angle $\gamma_{gcs}$ of the lidar sensor 1, the assembly 2 of the lidar sensor 1 is tilted vertically by the adjusting device 3 by the angle β (see FIG. 2). The sensor units S1-S4 are thereby tilted an angle of α+β, 2α+β, 3α+β, or respectively 4α+β relative to the ground surface 5. If β=4·α is selected, the overall opening angle $\gamma_{gcs}$ accordingly increases to 2·γ. If the assembly 2 is tilted vertically by another angle β by the adjusting device 3 and the measurement is repeated, the overall opening angle $\gamma_{gcs}$ increases to 3·φ, etc.

When there are four transmitting units S1-S4 with an opening angle of 4·α and one adjusting device 3 that can be tilted overall by 4·β, 20 scan planes are accordingly yielded with an overall opening angle of $\gamma_{gcs}$=5 γ=20α. This has increased the measuring time by five times, wherein the time for tilting by the adjusting device 3 must also be considered.

Alternatively, the adjusting device 3 can primarily be used to increase the resolution. This will be explained with a brief example. The angle between the light beams of two adjacent transmitting units S1-S4 (i.e., for example between S2 and S3) is α. β can now be selected as a fraction of α. If the adjusting device 3 is able to assume a total of five positions (90°, 90°-β, 90°-2β, 90°-3β and 90°-4β), β is selected as β=α/5.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. Any reference signs in the claims should not be construed as limiting the scope.

What is claimed is:

1. A lidar sensor for a motor vehicle comprising at least four transmitting units and at least four receiving units, wherein the transmitting units are designed to pivot light signals in a horizontal direction, wherein a light signal of a first of the transmitting units is tilted at a first angle relative to the ground surface; and the light signals of a plurality of the transmitting units are each tilted relative to the ground surface at angles that differ from each other, wherein each of the angles is larger than the first angle; wherein the transmitting units and the receiving units are designed as an assembly; and the lidar sensor has an adjusting device that is designed so that the assembly can be tilted by at least one angle β in a vertical direction.

2. The lidar sensor according to claim 1, wherein at least four transmitting units and receiving units are designed as an assembly to which a common adjusting device is assigned.

3. The lidar sensor according to claim 2, wherein all transmitting units and receiving units are designed as an assembly to which a single adjusting device is assigned.

4. The lidar sensor according to claim 1, wherein the adjusting device is designed to tilt the assembly in a plurality of angles β in a vertical direction.

5. The lidar sensor according to claim 1, wherein the light beams of the transmitting units in a vertical direction define an opening angle γ, wherein the adjusting device is designed to tilt the assembly by at least the opening angle γ.

6. The lidar sensor according to claim 1, wherein the light beams of adjacent transmitting units define a partial opening angle α, wherein the adjusting device is designed to tilt the assembly by at least a fraction of the partial opening angle α.

7. A method for optically scanning an environment of a motor vehicle using a lidar sensor according to claim 1 with at least four transmitting units and at least four receiving units, wherein a first series of measurements is performed in a first position of the assembly, the adjusting device moves the assembly into at least one second position, in which the assembly is tilted by a vertical angle β, wherein at least one series of measurements is performed in the second position.

8. The lidar sensor according to claim 2, wherein the light beams of the transmitting units in a vertical direction define an opening angle γ, wherein the adjusting device is designed to tilt the assembly by at least the opening angle γ.

9. The lidar sensor according to claim 3, wherein the light beams of the transmitting units in a vertical direction define an opening angle γ, wherein the adjusting device is designed to tilt the assembly by at least the opening angle γ.

10. The lidar sensor according to claim 4, wherein the light beams of the transmitting units in a vertical direction define an opening angle γ, wherein the adjusting device is designed to tilt the assembly by at least the opening angle γ.

11. The lidar sensor according to claim 2, wherein the light beams of adjacent transmitting units define a partial opening angle α, wherein the adjusting device is designed to tilt the assembly by at least a fraction of the partial opening angle α.

12. The lidar sensor according to claim 3, wherein the light beams of adjacent transmitting units define a partial opening angle α, wherein the adjusting device is designed to tilt the assembly by at least a fraction of the partial opening angle α.

13. The lidar sensor according to claim 4, wherein the light beams of adjacent transmitting units define a partial opening angle α, wherein the adjusting device is designed to tilt the assembly by at least a fraction of the partial opening angle α.

14. The lidar sensor according to claim 1, wherein the transmitting units are arranged in a vertical stack and the first transmitting unit is arranged at the top of the vertical stack.

15. The lidar sensor according to claim 1, wherein the light signal of each of the plurality of the transmitting units is tilted relative to the ground surface at an angle that corresponds substantially to a multiple of the first angle.

16. The lidar sensor according to claim 15, wherein the transmitting units are arranged in a vertical stack and the first transmitting unit is arranged at the top of the vertical stack.

17. The lidar sensor according to claim 1, wherein the angles of the light signals of the transmitting units differ from each other by a fixed angular distance.

18. The lidar sensor according to claim 16, wherein the transmitting units are arranged in a vertical stack and the first transmitting unit is arranged at the top of the vertical stack.

* * * * *